May 22, 1923.

C. D. ANDREW 1,456,293

CHUCK FOR LATHES AND THE LIKE

Filed Nov. 12, 1921

INVENTOR:
Cecil D. Andrew
BY Wm Wallace White
ATT'Y.

Patented May 22, 1923.

1,456,293

UNITED STATES PATENT OFFICE.

CECIL DANIEL ANDREW, OF BUXTON, ENGLAND.

CHUCK FOR LATHES AND THE LIKE.

Application filed November 12, 1921. Serial No. 514,495.

*To all whom it may concern:*

Be it known that I, CECIL DANIEL ANDREW, a subject of the King of Great Britain, residing at Portland House, Park Road, Buxton, in the County of Derby, England, have invented new and useful Improvements in or relating to Chucks for Lathes and the like of which the following is a specification.

The invention relates to a driving chuck attachment which is intended to be affixed to the face plate of a lathe to facilitate the turning of shafts, axles and the like particularly in the rough forged condition but it is also useful for machining any plain cylindrical work which requires to be turned between the centres of a lathe and the primary object of the invention is to provide an improved device whereby work which is not truly symmetrical in section about its axis which is generally the case in rough forgings may be securely chucked and driven, the axis of the work being understood to mean a straight line drawn between the lathe centres on which the work is supported.

In the accompanying drawings—

Figure 1:
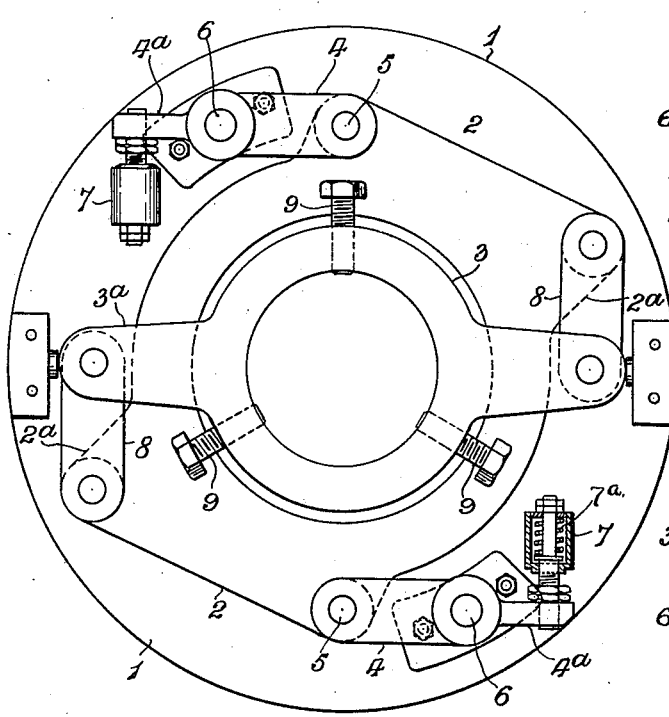
Figure 1 is an end elevation or face view of a chuck for a lathe constructed according to the present invention, one of the spring boxes being shown in section.
Figure 3:
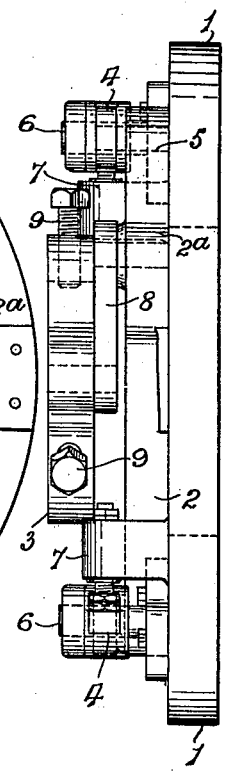
Figure 3 is a side or edge view thereof.
Figure 2:
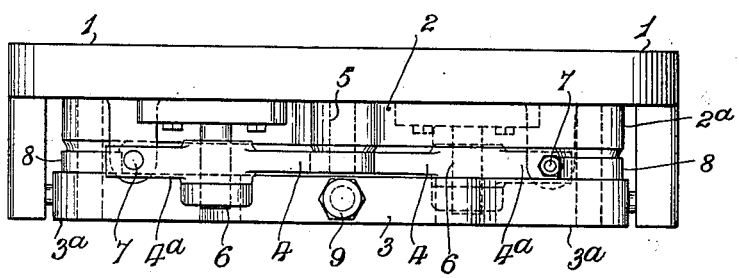
Figure 2 is a plan thereof.

1 represents the face plate, 2 represents the driving plate and 3 represents the dog.

The driving plate 2 is suspended from the face plate 1 by means of arms or levers 4 pivotally connected with the driving plate 2 at 5 and pivotally mounted upon studs 6 fixed upon the face plate 1 and the arms or levers 4 are furnished with extensions 4ᵃ which are connected with the face plate 1 by means of spring connections consisting of a spring box 7 containing a spring 7ᵃ connected to the extension 4ᵃ by a suitable stud.

The driving plate 2 is furnished with offset 2ᵃ to which are pivotally connected the ends of links 8 and the dog 3 is provided with lateral arms or extensions 3ᵃ to which the other ends of said links 8 are pivotally connected, the dog 3 being furnished with set screws 9 as shown, or with other suitable means for securing the work in position therein.

From the foregoing it will be seen that the dog 3 is suspended from the driving plate 2 whilst the driving plate 2 is suspended from the face plate 1, the dog 3 being more or less controlled or centered by the spring devices 7.

A chuck attachment constructed as hereinbefore described will accommodate itself to any inequality of the work due to lack of symmetry of section about the axis thereof and at the same time will provide a positive and powerful drive without imparting vibration to the work, while the work cannot be forced out of its true and normal path of revolution inasmuch as the driving dog yields radially to accommodate any eccentricity in the work.

It will be obvious that the details of construction of the device may be modified without departing from the principle of the invention.

What I claim as my invention and desire to secure by Letters Patent is:—

1. In a chuck for lathes and the like, a face plate, a driving member, spring controlled means for suspending said driving member from the face plate, and a dog suspended from said driving member.

2. In a chuck for lathes and the like, a face plate, arms pivotally mounted upon the face plate, a driving member suspended from said arms flexible members connecting said arms with the face plate, a dog, links connecting said dog with said driving member, and means for gripping the work.

In testimony whereof I have signed my name to this specification.

CECIL DANIEL ANDREW.